April 28, 1964   W. A. BEDFORD, JR   3,130,948
FASTENER FOR SUPPORTING A CONDUCTOR
Filed Aug. 16, 1961
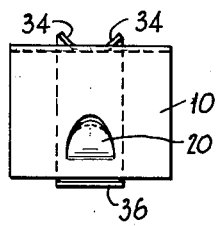
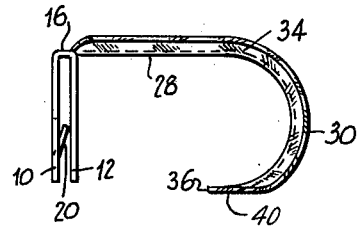
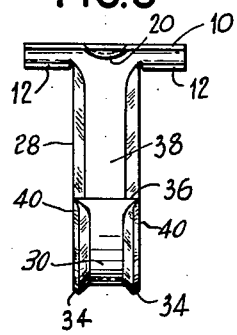
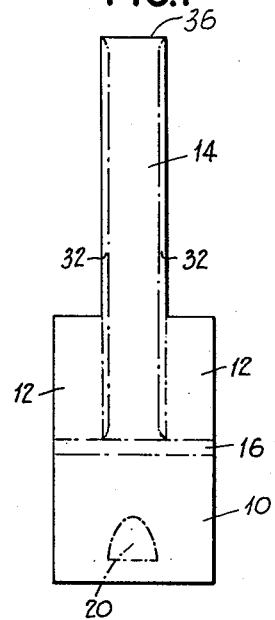
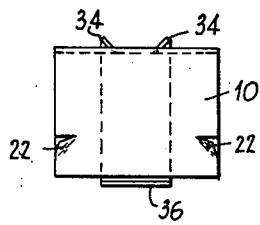
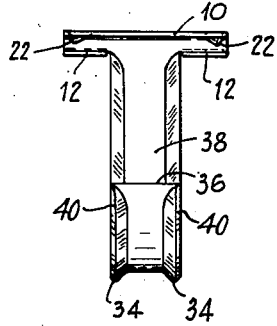
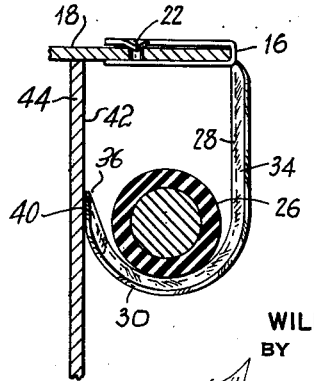
INVENTOR
WILLIAM A. BEDFORD, JR
BY
ATTORNEY

United States Patent Office 3,130,948
Patented Apr. 28, 1964

3,130,948
FASTENER FOR SUPPORTING A CONDUCTOR
William A. Bedford, Jr., Littleton, Colo., assignor, by mesne assignments to Thompson Bremer & Company, Chicago, Ill., a corporation of Delaware
Filed Aug. 16, 1961, Ser. No. 131,825
1 Claim. (Cl. 248—58)

The present invention relates to an improved fastener device which is particularly suitable for securing lengths of cable or wire-like members to panels, moldings or other sheet bodies.

Numerous advantages and uses will become apparent from the following description of the preferred forms. In the description, reference is made to the accompanying drawings, in which:

FIG. 1 is a view of the fastener in blank form;

FIGS. 2, 3 and 4 are respectively a plan, front, and side elevational view of the fastener formed from the blank of FIG. 1, and;

FIGS. 5, 6 and 7 are respectively a plan, front, and side elevational view of a modified form of the fastener, the manner of mounting both forms of the invention on a mounting frame being illustrated in FIG. 7.

In FIG. 1, there is shown the fastener device of FIGS. 2–4, in blank, after being punched, stamped or otherwise suitably sheared as a unitary piece from a flat rectangular strip of steel, aluminum or other metallic material. The blank of FIG. 1 includes a base portion 10 having a pair of tabs 12 disposed on either side of an integral, elongated, shank member 14 extending outwardly of the base.

As further shown in the succeeding figures, the device is formed into its final shape by bending the tabs 12 back in a reverse manner over the base 10 along the area 16 so that they lie in spaced parallel relationship to the base. The base 10 and tabs 12 thus cooperatively form a spring clip having a U-shaped cross section which may be easily adapted to fit over the edge of a substantially flat panel molding or frame flange 18, as shown in FIG. 7. The relative size of the base 10 and tabs 12 and their U-shaped cross section allows the device to be securely fastened. However, to insure rigidity and additional security, particularly with panels or sheets having a greater or lesser thickness than the bight of the clip cross section, a prong 20 (FIGS. 1–4) or prongs 22 (FIGS. 5–7) may be provided. The prong 20 or prongs 22 are stamped or punched within the base at such an angle that they will bite into the panel or frame flange 18 or interlock with a hole or recess provided therein and prevent the device from being easily removed. In the modification shown in FIGS. 1–4, the prong is located at substantially the center of the base 10 and is elliptical in shape. In the modification shown in FIGS. 5–7, the prongs 22 are triangular in shape and are punched along the edges of the base 10. In both modifications, however, the sharp pointed edges of the prongs act in combination with the resilient force exerted by tabs 12 to securely fasten the clip in place over the edge of the panel or frame flange 18. Other specific prong formations may suggest themselves to practitioners in the art.

The shank member 14 is itself fashioned to form a stem portion 28 and a hook portion 30 substantially overlying the base 10 or clip, so that an electrical wire or cable 26 (as shown in FIG. 7) or a plurality of the same may be lodged or secured in the hook portion. The shank member 14 of the blank is bent to form a J-shaped hook integral with the base 10, the stem portion 28 being substantially normal to the base 10 and the hook portion 30 curving in substantially circular arc over the base.

In forming the J-shaped hook structure, the flat shank 14 of the blank is bent along its side edge portions 32 to form a pair of parallel ridges or flanges 34 running from adjacent the base almost to the extreme free end 36. This provides beveled edges along both sides of the shank and a smooth, non-tearing and non-incisive inner surface 38 for engagement with the wire or cable lodged or secured in the hook portion 30. The free end 36 of the hook portion, however, is preferably left flat or substantially square in order to avoid forming additional sharp edges or corners there. Furthermore, the flat end 36 permits the hook to be crimped or squeezed over the wire or cable, or a plurality of the same should it be desired to more-or-less permanently secure them in the hook.

In both of the illustrated forms of the invention, the side flanges 34 form a channel-shaped transverse cross-section for the stem portion 28 and hook portion 30 that is inwardly convex and substantially continuous from adjacent the base portion 10 of the fastener to adjacent the free end of the hook portion. At the free end of the hook portion, the edge portions 32 of the blank are shaped to merge from the planes of the flanges 34 into the plane of the inner surface 39 (FIGS. 2–4 and 5–7) so that, in effect, the ends of the flanges at the free end of the hook portion are tapered to substantially zero width to provide tapered end edges 40 thereof (FIGS. 3, 4, 6 and 7) that extend generally perpendicular to the base portion 10. This leaves the free end 36 of the hook portion substantially flat (i.e., with no outwardly projecting flanges) and with a thickness not materially exceeding the thickness of the sheet metal from which the fastener is formed.

As shown in FIG. 7, the shape of the free end of the hook portion 30 just described permits the tapered end edges 40 of the flanges 34 and the flat, free end 36 of the hook portion to abut a frame surface 42 of a frame panel 44 disposed perpendicular to the frame flange 18. The flat, free end 36 of the hook portion may thus hug the frame surface 42 and slope smoothly away from it along the inner hook surface 38. This eliminates or, at least greatly minimizes the possibility for inner corners or edges of the free end 36 of the hook portion to engage and tear or cut through insulation on the electrical conductor 26 (or any of a plurality of such conductors) seated or supported in the hook portion of the fastener. In this manner, accidental electrical shorts due to cutting or tearing of conductor insulation by the free end of the hook portion of the fastener are virtually eliminated, despite any movement of the conductors caused by vibration of the mounting frame or occurring during initial assembly or subsequent repair or maintenance work on the machine or structure with which such fasteners are used.

In addition to the foregoing safety features, numerous additional advantages accrue to the fastener described.

First, because of its unitary and integral construction, the device may be economically and easily made.

Second, because the clip portion of the device is formed with a relatively broad base and a pair of oppositely disposed tabs, both cooperating to provide a spring action, a single size device may be used on panels or other sheet material of varying thicknesses.

Third, because of the provision of prong retaining members, the device may be used with sheets of varying materials, such as metals, wood, fiberboard, plastic, etc. since the prongs may be used to both dig into the material or fit within holes or recesses formed in the material.

Fourth, because of the provision of the flanged edges along the sides of the hook member, fragile or delicate materials may be used for the wire or cable coverings without fear of tearing, marking or breaking.

Fifth, because of the flanged edges of the hook member, wire or cables of great weight may be lodged or secured therein since the beveled edges provide a bracing and strengthening of the hook.

Sixth, because of the construction of the hook, particularly the flat exereme end thereof, the hook may be crimped or squeezed to rather permanently retain the wire or cable therein.

Other objects and advantages are apparent from the foregoing description and the accompanying drawing. It is to be also understood that the description and drawings are intended to show the preferred forms of the invention and that changes, alterations and modifications may be made without departing from the spirit and scope thereof as represented by the appended claim.

I claim:

A unitary fastener for supporting an insulated electrical conductor on a frame, the fastener being formed as an integral piece of sheet metal and comprising—

(a) a base portion adapted to be secured to a frame flange;

(b) a substantially straight stem portion projecting from said base portion; and (c) a hook portion constituting a free-end extension of said stem portion and curving through substantially 180° to overlie said base portion and extend back parallel to said stem portion;

said stem portion and hook portion having opposite side flanges that curve outwardly to provide an inwardly convex, channel-shaped, transverse profile continuously from adjacent said base portion to adjacent the free end of the hook portion; and the ends of said side flanges at the free end of said hook portion being tapered to substantially zero width at said free end to provide tapered end edges thereof extending generally parallel to said stem portion and to leave the free end of said hook portion substantially flat with a thickness not materially exceeding the thickness of the sheet metal from which the fastener is formed.

References Cited in the file of this patent

UNITED STATES PATENTS

| | | |
|---|---|---|
| 1,943,261 | Knutson | Jan. 9, 1934 |
| 2,061,463 | Hall | Nov. 17, 1936 |
| 2,928,637 | Jansson | Mar. 15, 1960 |
| 3,019,954 | Faltin | Feb. 6, 1962 |